United States Patent [19]

Gavronsky et al.

[11] Patent Number: 5,335,483
[45] Date of Patent: Aug. 9, 1994

[54] METHOD AND APPARATUS FOR PRODUCING FOAM CUSHIONS FOR PACKAGING PURPOSES

[75] Inventors: German Gavronsky; Ramiro Guarderas, both of Stamford, Conn.

[73] Assignee: Sealed Air Corporation, Saddle Brook, N.J.

[21] Appl. No.: 939,451

[22] Filed: Sep. 2, 1992

[51] Int. Cl.$^5$ ............................................. B65B 9/08
[52] U.S. Cl. ...................................... 53/451; 53/455; 53/552; 53/562
[58] Field of Search ............... 53/450, 455, 472, 476, 53/451, 452, 459, 467, 547, 562, 568, 67, 69, 71, 505, 66, 258–260, 550–552; 156/352, 356, 357, 546, 549–551, 251; 141/67, 70, 193, 312, 313, 316, 317, 365, 368, 373, 201, 208; 264/46.2, 46.3, 46.5; 425/114

[56] References Cited

U.S. PATENT DOCUMENTS

| | | | |
|---|---|---|---|
| 2,146,308 | 2/1939 | Maxfield | 53/450 |
| 3,021,652 | 2/1962 | Greisman . | |
| 3,222,843 | 12/1965 | Schneider | 53/472 |
| 3,295,289 | 1/1967 | Critchell | 53/568 |
| 3,419,134 | 12/1968 | Fitts | 53/472 |
| 4,153,085 | 5/1979 | Adams | 141/311 R |
| 4,411,123 | 10/1983 | Gautier | 53/562 |
| 4,674,268 | 6/1987 | Gavronsky et al. . | |
| 4,676,051 | 6/1987 | Hoskinson et al. | 53/455 |
| 4,735,674 | 4/1988 | Pace . | |
| 4,800,708 | 1/1989 | Sperry . | |
| 4,854,109 | 8/1989 | Pinarer et al. . | |
| 4,995,217 | 2/1991 | Francis, Jr. | 53/455 |
| 4,999,975 | 3/1991 | Willden et al. . | |
| 5,007,744 | 4/1991 | Scarberry et al. . | |
| 5,027,583 | 7/1991 | Chelak . | |
| 5,027,584 | 7/1991 | McMahon et al. . | |
| 5,058,364 | 10/1991 | Seiden et al. | 53/455 |

Primary Examiner—Michael W. Ball
Assistant Examiner—R. Robey
Attorney, Agent, or Firm—Bell, Seltzer, Park & Gibson

[57] ABSTRACT

An apparatus and method are disclosed for successively forming foam filled cushions for packaging purposes of the type in which a bag containing foam precursors is added to a container so that as the foam precursors form foam, the bag forms a custom cushion adjacent objects in the container. The method comprises attaching an adhesive strip to the longitudinal edges of a pair of sheets of plastic film material being advanced along predetermined paths of travel in face to face contact from a stock supply, and between which sheets a foamable composition is injected, to thereby join the sheets together and form one edge of the bag, while periodically sealing the leading edge and the trailing edge of the sheets together transversely to the path of travel to form a bag while periodically severing a completed bag from the next succeeding bag being formed.

11 Claims, 5 Drawing Sheets

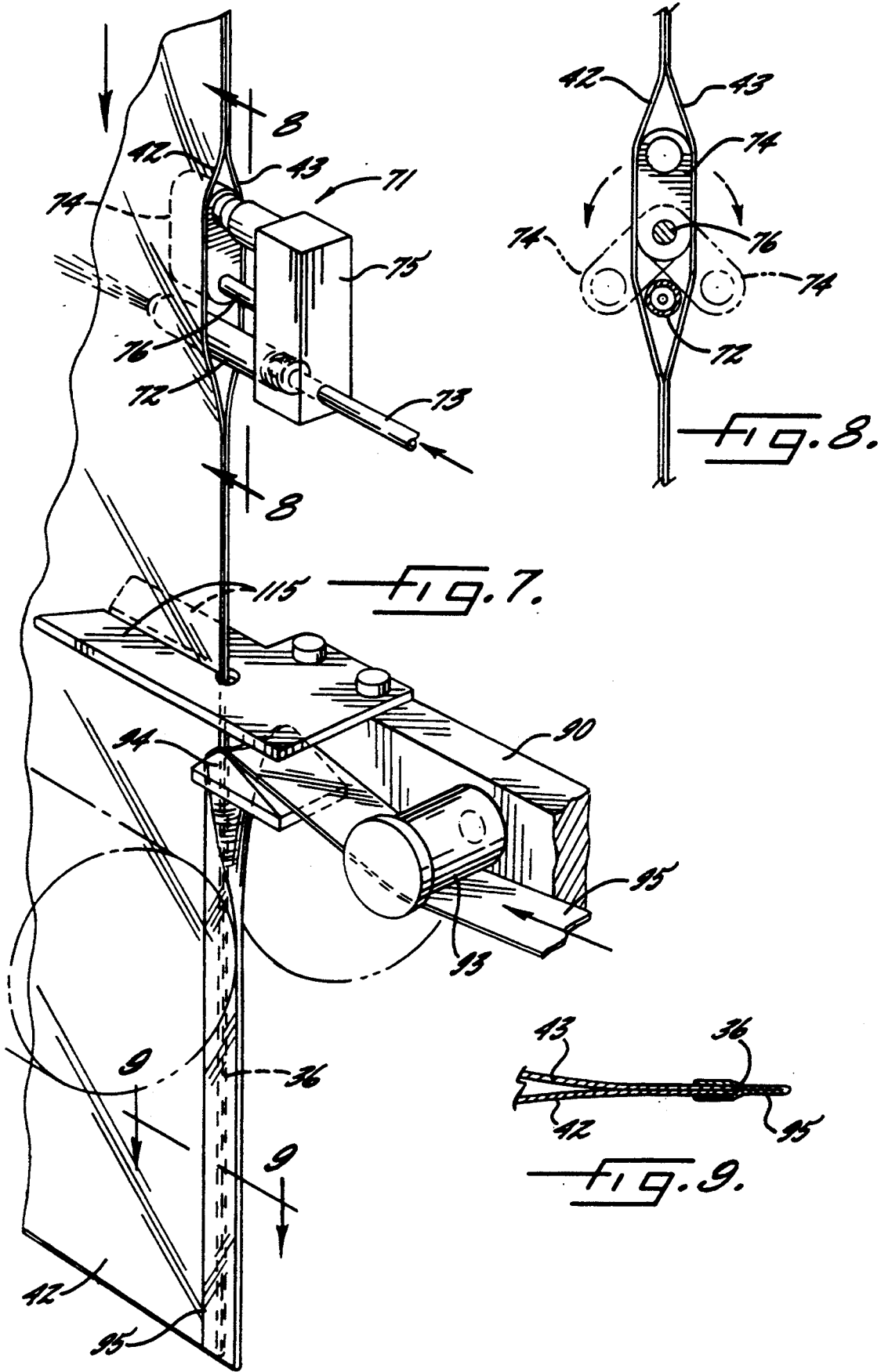

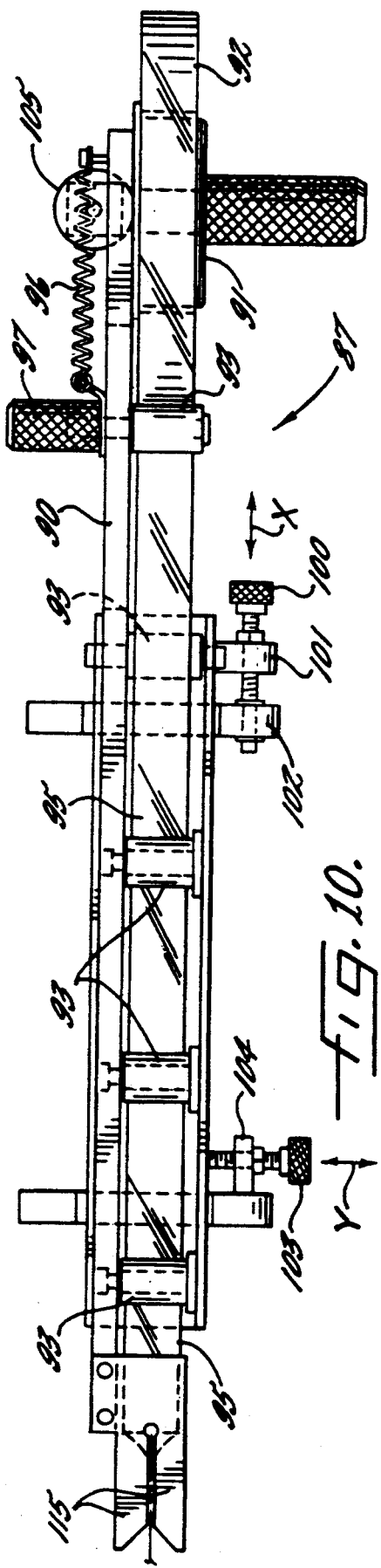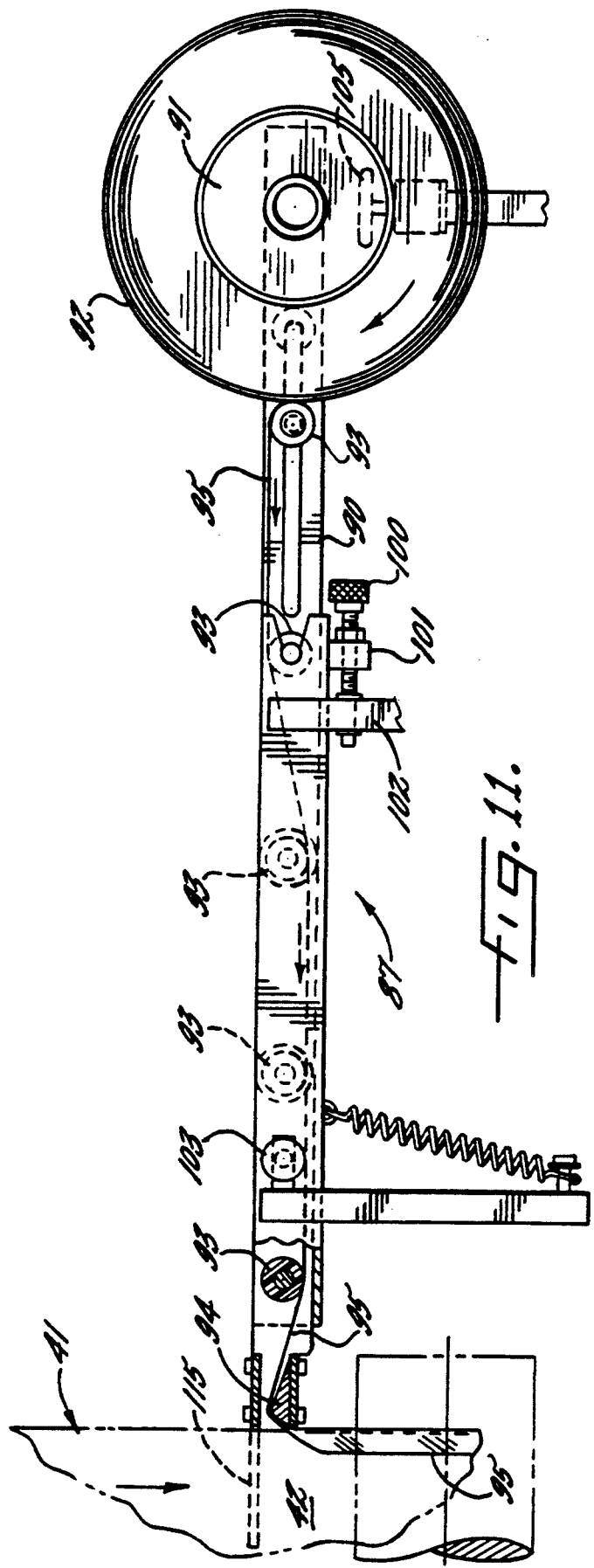

METHOD AND APPARATUS FOR PRODUCING FOAM CUSHIONS FOR PACKAGING PURPOSES

FIELD OF THE INVENTION

The present invention relates to the production of foam filled cushions for packaging purposes, and in particular relates to an automated device for successively producing such cushions from a stock supply roll of center folded plastic film material.

BACKGROUND OF THE INVENTION

The present invention relates to custom packaging of fragile articles. There are several basic ways to protect such articles, particularly when they are to be stored or shipped in generally rectangular containers such as cardboard boxes. One method is to fill the areas surrounding the fragile object in the box with a loose friable material such as expanded polystyrene pieces, shredded paper, or popcorn. Although providing an appropriate cushion, such packaging techniques generally require large amounts of storage space for the friable material before it is used, and tend to produce large amounts of unwanted loose material when the packages are opened.

A second method is to form a custom rigid framework, typically of polystyrene foam, that positions and maintains a particular object in place in a particular sized box. Although this can be useful and efficient where large numbers of identical items are repeatedly placed in identical boxes, it lacks the flexibility required in some packaging operations in which the sizes and shapes of the objects being packaged may constantly vary. For example, a number of packagers supply a wide variety of items of different sizes and shapes to their customers on a regular basis.

A third form of custom packaging is foam-in-place packaging. In such applications, the fragile article is typically placed into a container such as a cardboard box and covered with a plastic sheet material after which a mixture of polymer precursor chemicals is injected into the empty spaces in the box. The preferred chemicals react to form gases as they polymerize and harden. The result is that the generated gases, when combined with the hardening action of the chemicals, forms a foam that expands into the empty spaces in the container and surrounds the object to be packaged in a custom manner. Typical precursors are those of the isocyanate variety that react to form polyurethanes while generating carbon dioxide and water vapor to produce the foaming action.

Although foam-in-place applications remain quite useful for custom packaging, they are somewhat disadvantageous in certain circumstances. For example, the foam precursors are typically injected from a hand-held dispenser or "injection cartridge" which must be operated manually. Additionally, the foaming chemicals tend to be sticky and find their way into many unintended locations during the packaging process. As a result, foam-in-place applications using manually operated injection systems remain an excellent option for packagers who need custom packaging on a time-to-time basis, but are somewhat inefficient for those requiring large volume packaging applications.

As a result, there has been developed a series of automated devices that produce plastic bags into which a foamable composition is injected as the bag is being formed. The bag can then be simply dropped into the box with the object to be packaged. As the precursor compositions form foam, the bag expands and surrounds the article in a custom manner. Such devices are described in U.S. Pat. Nos. 4,674,268; 4,800,708; 4,854,109; and 5,027,583; and in pending U.S. application Nos. 07,843,609 filed Feb. 23, 1992 to Sperry et al.; and 07/766,810 filed Sep. 26, 1991 to Sperry et al., all of which are assigned to the assignee of the present invention.

As will be noted from these patents and pending applications, the typical method of forming a foam-in-place cushion from a plastic bag is to heat seal sheets of plastic film material together both transversely and longitudinally as they are being fed from a stock supply to form a generally rectangular bag with the foam inside. In alternative embodiments, the stock supply of plastic film material can be fed in center folded fashion so that one side of the bag is a fold, rather than a heat seal. These devices have gained rapid and wide acceptance in the marketplace and have served their purposes well.

There are, however, situations for which heat sealing raises its own problems. For example, the task of heat sealing plastic requires a careful balance between supplying sufficient heat to seal the plastic while avoiding the amount of heat that would sever the plastic. In turn, this balance requires that heat sealing equipment will usually require adjustment to accommodate different thicknesses or gauges of plastic film material. Furthermore, in order to avoid severing, the heat seals that are formed may be somewhat weaker than would otherwise be desired. Additionally, plastic film material is often inconsistent in its supply characteristics so that even a sensitive heat seal adjustment may often fail to either completely seal the plastic or will entirely sever it. As another consideration, heat sealing tends to be more reliable for large volume, rapidly repetitive (i.e. continuous) cushion manufacturing, but is less reliable for the intermittent cushion bag formation that many packagers require or desire. Finally, heat sealing raises maintenance and reliability problems. For example, plastic material can quickly build up on a heating system after repeated use.

Therefore, the need exists for an automated method and apparatus for repetitively and rapidly producing foam-in-place cushions which minimize or avoid the problems of heat sealing.

OBJECT AND SUMMARY OF THE INVENTION

It is therefore an object of the present invention to provide a method and apparatus for producing foam-in-place cushions in which the heat seals are replaced by a more efficient and desirable sealing technique.

The invention meets this object by providing a method of attaching an adhesive strip to the longitudinal edges of a pair of sheets of plastic film material being advanced along predetermined paths of travel in face-to-face contact from a stock supply, and between which sheets a foamable composition has been injected, to thereby join the sheets together and form one edge of the bag while the leading edge and trailing edge of the sheets are periodically sealed and severed to form a bag while periodically severing completed bags from the next succeeding bags being formed.

In another embodiment, the invention comprises an apparatus for forming foam filled cushions for packaging purposes which comprises means for advancing a pair of sheets of plastic film material along predetermined paths of travel in face-to-face contact from a stock supply, means for periodically sealing the leading edge of the sheets together transversely to the path of travel to form the leading edge of a bag being formed while concurrently forming the trailing edge of the previous bag, and while severing the previous bag from the bag being formed, means for periodically introducing a foamable composition between the sheets into each bag being formed, and means for attaching a strip to a longitudinal edge of both sheets as the sheets are being advanced to join the sheets together and form another edge of the bag.

In another embodiment, the invention comprises a sealing mechanism for forming transverse seals in advancing portions of heat sealable material such as plastic film.

In yet another embodiment, the invention comprises a cushion for custom packaging purposes which comprises a bag formed of plastic film material having one folded side, two heat sealed sides, one tape sealed side, a ventilation opening, and a foamable composition inside.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DESCRIPTION OF THE DRAWINGS

FIG. 7 is a partial perspective view of both the film advancing mechanism, the tape advancing and application mechanism, and the foam injection mechanism of the present invention;

FIG. 8 is a cross-sectional view of the foam injection system taken along lines 8—8 of FIG. 7;

FIG. 9 is a cross-sectional view of one edge of a cushion being formed taken along lines 9—9 of FIG. 7;

FIG. 10 is a top plan view of the adhesive tape dispenser cartridge according to the present invention; and FIG. 11 is a side elevational view of the tape dispenser cartridge according to the present invention.

DETAILED DESCRIPTION

Figure 1:
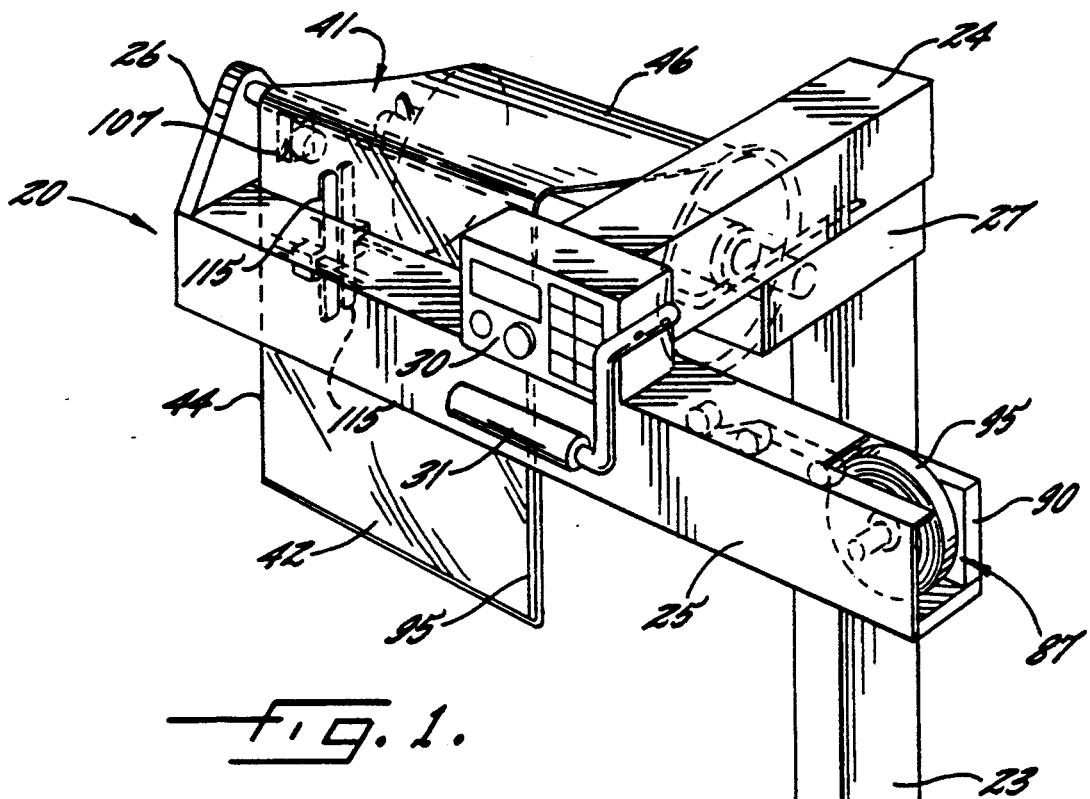
FIG. 1 is a perspective view of an apparatus according to the present invention.

FIG. 1 is a perspective view of an apparatus broadly designated at 20 for forming foam filled cushions for packaging purposes of the type in which a bag containing foam precursors is added to a package so that as the foam precursors form foam the bag forms a custom cushion adjacent objects to be packaged. The apparatus 20 is positioned upon a frame which has lower footing portions 21 and appropriate wheels 22 for moving the apparatus into a desired position. An upright frame member 23 carries the main working portions of the device and the apparatus 20 further includes perpendicular members 24 and 25 that also serve as a housing for the working portions. Other frame members include the somewhat triangular portion 26 and another horizontal member 27 that help support the supply hub to be described later herein.

FIG. 1 also illustrates a control panel 30 for the operator's convenience in using the apparatus 20 and a handle 31 which can be used to open the device for appropriate adjustment and maintenance purposes.

Figure 2:
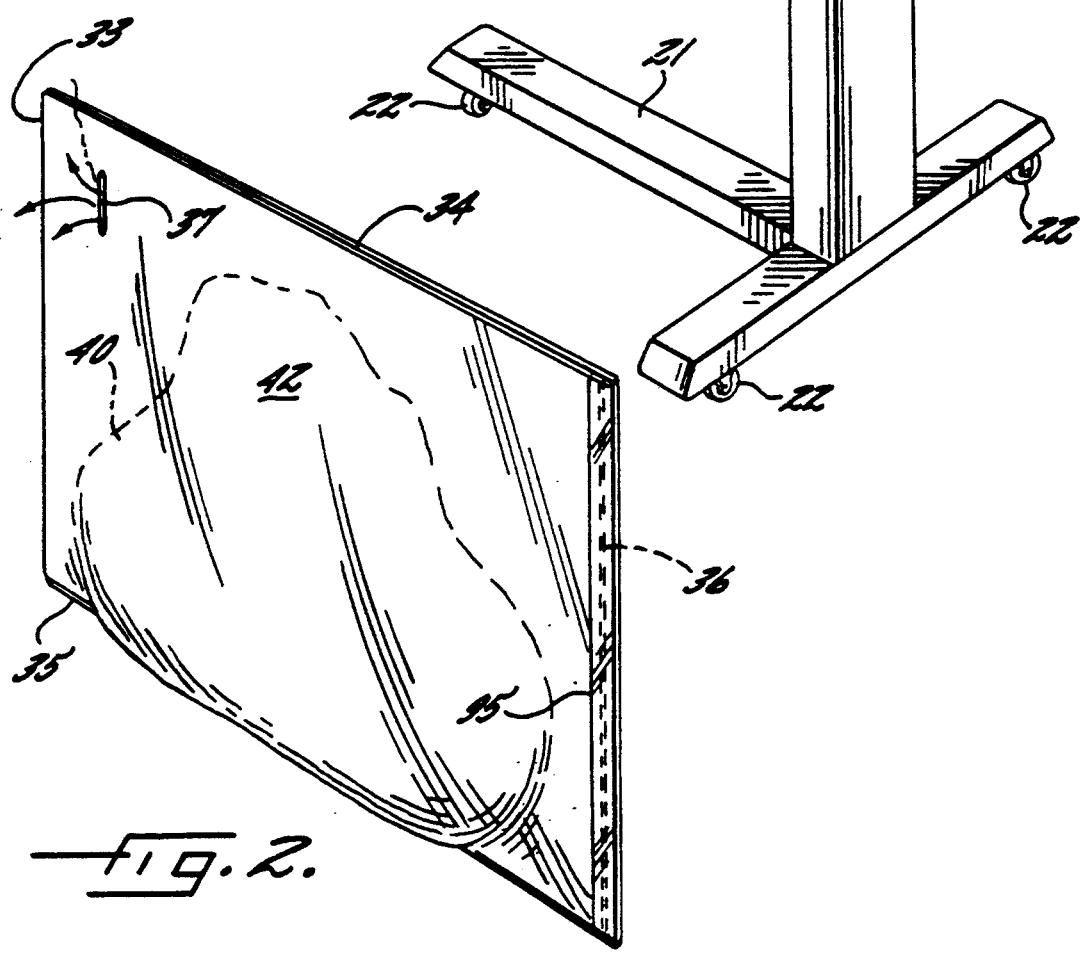
FIG. 2 is a perspective view of a bag cushion formed according to the present invention.

FIG. 2 illustrates a bag cushion according to the present invention. As illustrated by FIG. 2, the bag, broadly designated at 32 comprises a plastic film material. One side 33 of the bag is folded, two sides 34 and 35 are heat sealed and severed, and the fourth side 36 is tape sealed. The bag further comprises a ventilation opening 37 and contains a foamable composition 40 inside. In the preferred embodiment, the bag is rectangular with the folded side 33 parallel to the tape sealed side 36 and the heat sealed sides 34 and 35 similarly parallel to one another.

Figure 3:
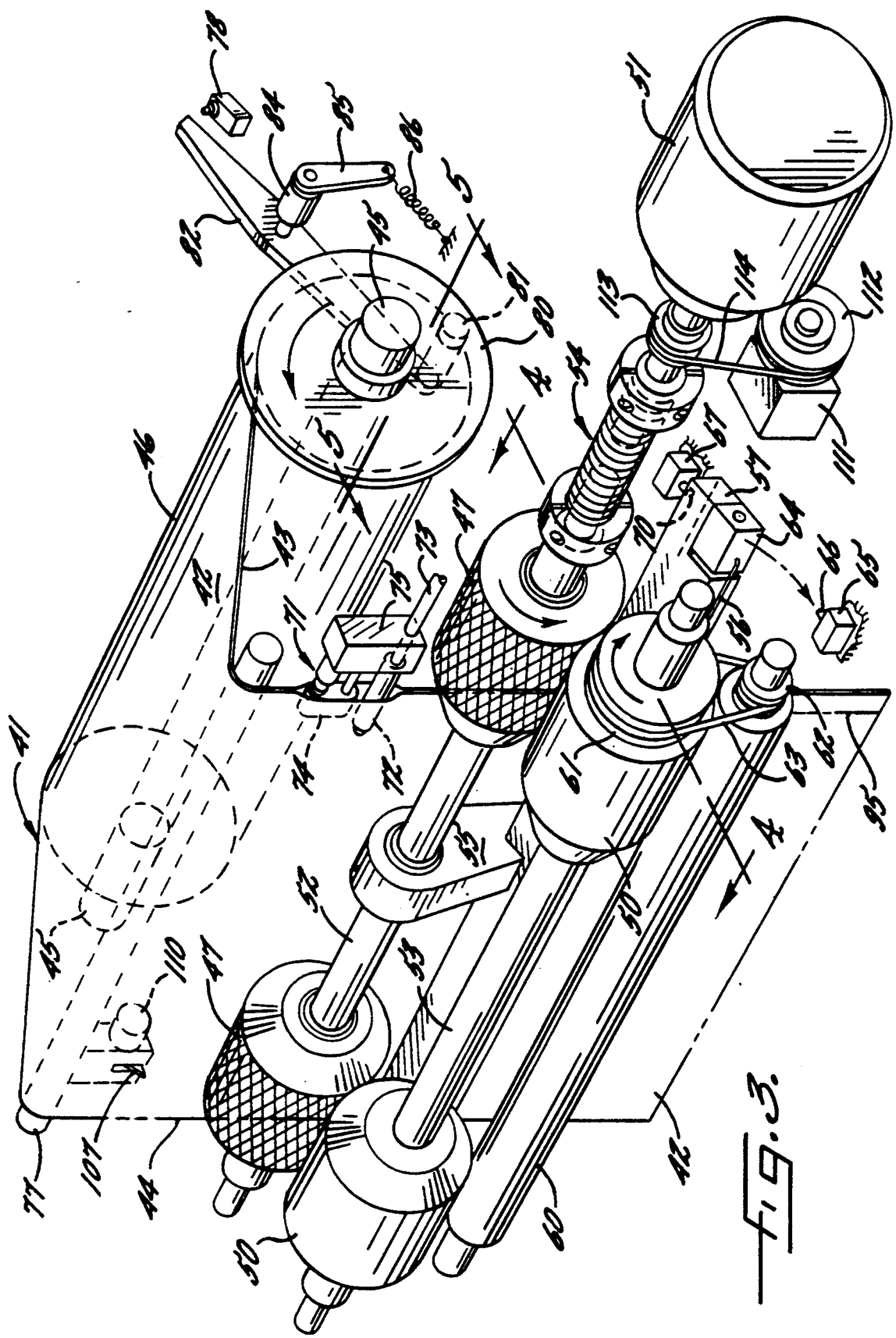
FIG. 3 is a partial view of the film advancing and sealing mechanisms of the present invention.

FIG. 3 illustrates the means for advancing the pair of sheets of plastic film material along predetermined paths of travel in face-to-face contact from a stock supply. In the preferred embodiment, the plastic film material is a single sheet broadly designated at 41 that has been longitudinally folded along its center to form a respective pair of sheets 42 and 43 having one closed side edge 44 defined by the center fold. Thus, the advancing means preferably comprises means for advancing a single sheet of plastic film material folded along its center portion.

As illustrated in FIG. 3, the advancing means comprises a supply hub 45 for carrying a stock supply roll 46 of folded film material, and a pair of coaxial driven rollers 47 downstream of the supply hub 45. A pair of coaxial follower rollers 50 are opposite to and in engagement with the driven rollers 47 for driving plastic film material between the driven rollers 47 and the follower rollers 50 and for further defining the path of travel of the plastic sheets 42 and 43. As further described hereinbelow, a motor 51 drives the driven rollers 47.

As further illustrated in FIG. 3, the driven rollers are carried by a first shaft 52 and the idle rollers are carried by a second shaft 53. The driven rollers 47 are spaced apart from one another on the first shaft 52 and the first shaft 52 is rotatable in both the clockwise and counterclockwise directions. One of the directions defines the advancement of the plastic film material along a predetermined path of travel from the supply hub 45 to the driven rollers 47. As illustrated in FIG. 3, a counterclockwise rotation of the shaft 52 and the driven rollers 47 defines the advancement of the plastic film material, although it will be understood that were the driven rollers 47 placed on an opposite side of the plastic film material 41, the clockwise direction would define the advancement.

FIG. 3 further illustrates that a torsional spring 54 couples the motor to the first shaft 52. Furthermore, an arm 55 depends from center portions of the first shaft 52 between the driven rollers 47. A transverse heat sealing wire 56 is carried by the arm 55 on a perpendicular wire bar 57. The wire 56 is thus oriented perpendicular to the path of travel for being rotated into sealing contact with heat sealable plastic material in the path of travel when the first shaft 52 rotates counter to the direction of advancement. The wire is typically formed of a metal that heats relatively rapidly upon application of an electric current to it, and such materials and their use are well understood in this art, and in many others.

Furthermore, the torsional spring 54 urges the first shaft to rotate the wire 56 into engagement with the heat sealable material 41 even if counter rotation of the first shaft does not, in a manner to be described hereinbelow with respect to FIGS. 4A, 4B and 4C.

The wire 56, the wire bar 57 and the arm 55 and their operation in conjunction with the motor 51 and the shaft 52 provides the means for periodically sealing the leading edge of the sheets 42 and 43 together transversely to the path of travel to form the leading edge of a bag being formed while concurrently forming the trailing edge of the previous bag and while severing the previous bag from the bag being formed. As mentioned earlier herein, satisfactory heat sealing requires a balance between applying sufficient heat to seal the plastic, but not so much as to sever it. The present invention avoids sensitive heat sealing adjustments because it limits heat sealing to concurrent heat sealing and severing.

FIG. 3 also illustrates that the apparatus further comprises an anvil roller 60 below and parallel to the second shaft 53 and adjacent the path of travel at a point opposite to the position at which the heated wire 56 is rotated into sealing contact with the plastic film material 41. The roller 60 thereby provides an anvil against which the heated wire 56 can seal and sever the plastic film material 41. As illustrated in FIG. 3, the anvil roller 60 rotates when driven by a pulley 61 on the second shaft 53, a pulley 62 on the anvil roller 60, and a pulley belt 63 between the pulleys 61 and 62. In preferred embodiments, the size of the pulley 62 is selected so that the anvil roller 60 rotates faster than the follower rollers 50 so that the leading edge of each successive bag being formed is more effectively released from the anvil roller 60.

FIG. 3 further illustrates that the invention includes means for preventing the activation of the heat sealing wire 56 unless it is in proper contact with the anvil roller 60 and with the plastic film material 41 therebetween. In particular, the activation prevention means comprises the electrical contact 64 on the wire bar 57 and the corresponding contact 65 positioned adjacent the anvil roller 60. As illustrated in FIG. 3, when the wire bar 57 is rotated by the arm 55 into sealing position, the contact 64 meets the contact 65, shown with a spring loaded pin 66, which in turn provides the electrical energy that heats the wire 56. As further shown in FIG. 3, there is a corresponding contact 67 and pin 70 that meets the wire bar 57 when it is in its retracted position. Nevertheless, it will be seen that if the arm 55 rotates the wire bar 57 and the wire 56 to a point in between, but not touching either of the contacts 65 and 67, the wire 56 will lose all electrical contact and will quickly cool. This provides an important safety feature. For example, if an operator's hand were between the wire and the anvil roller for purposes of adjustment or clearing the machine, the contact 67 would be prevented from touching either of the contacts 65 or 67, and the wire 56 would either partially or completely cool, thus preventing a burn. In other words, the heating wire will be activated when it is in position adjacent the anvil 60, but will remain inactivated when nonadjacent the anvil roller 60 to thereby prevent activation of the wire 56 until the wire 56 is in a proper sealing position.

FIG. 3 also illustrates a means broadly designated at 71 for periodically introducing a foamable composition between the sheets into each bag being formed. In FIG. 3, the injection means 71 comprises an injection nozzle 72, and a supply system for foamable compositions illustrated in abbreviated fashion as the tubing 73. Such foam mixing and distribution systems are well established in this art and will not otherwise be described in detail. The injection means 71 further comprises means for preventing foam from being introduced other than between the advancing sheets 42 and 43. As illustrated, these means comprise the lever arm 74 adjacent the nozzle 72 which controls the flow of fluid from the nozzle 72 through the valve 75. Specifically, the lever arm is biased in a direction out of the path of travel while being movable into the path of travel. As a result, and as illustrated in FIGS. 3, 4A, 4B and 4C, the arm 74 remains in the path of travel as long as the respective plastic sheets 42 and 43 are on opposite sides of the arm 74. Alternatively, if either or both of the sheets are out of position with respect to the path of travel, e.g. as illustrated in FIG. 8, the arm will be biased out of the path of travel and will, in conjunction with the valve 75, prevent the nozzle 72 from injecting foam. As illustrated in FIG. 8, the simplest way of biasing the lever arm 74 is to mount it on a pin 76 on which it can pivot and fall out of the path of travel.

Figure 4A:
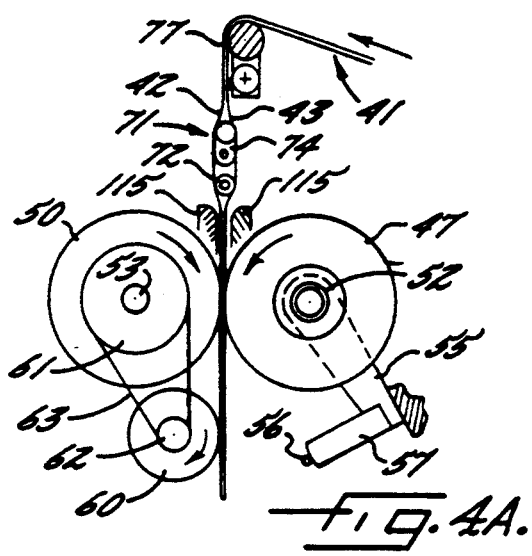
FIGS. 4A, 4B and 4C are cross-sectional views taken along lines 4—4 of FIG. 3 and sequentially illustrating the transverse sealing action of the apparatus of the present invention.
Figure 4B:
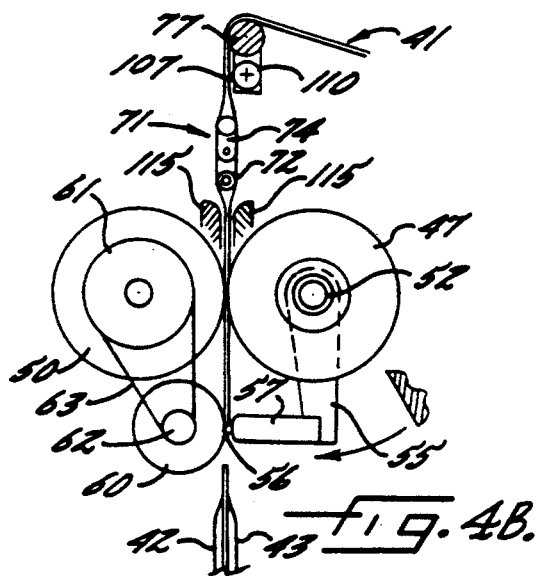
Figure 4C:
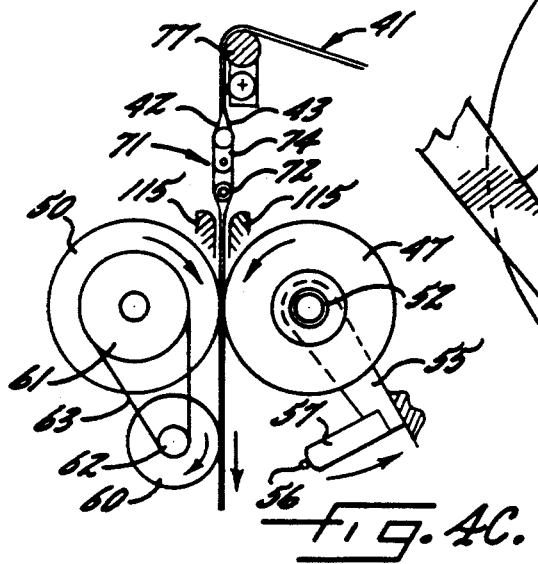

FIGS. 4A, 4B and 4C illustrate the steps of advancing the plastic film material, forming a transverse leading seal, and concurrently severing a completely formed bag from the next bag being formed. These figures illustrate the position of the various elements while the sheets of plastic film material 42 and 43 are being advanced from the stock supply roll, over a film guide bar 77 (also illustrated in FIG. 3), over the lever arm 74 and the nozzle 72 and then between the driven rollers 47 and the follower rollers 50. As set forth above, in the illustrated embodiment, the first shaft 52 is rotatable in both the clockwise and counterclockwise directions, with the counterclockwise rotation of shaft 52 defining the direction of advancement. It will be seen that counterclockwise rotation of the first shaft 52 rotates the arm 55, the associated wire bar 57, and heated wire 56 out of contact with the advancing sheets of plastic film material 42 and 43.

FIG. 4B shows the next step in the sequence. In this step, the shaft 52 rotates clockwise, while the driven rollers 47, the follower rollers 50, and the sheets 42 and 43 remain stationary. A clutch (not shown) allows driven rollers 47 to rotate with the shaft 52 in the advancement direction, but prevents them from rotating in the clockwise direction with the shaft 52. Thus, as illustrated in FIG. 4B, when the shaft 52 rotates in the clockwise direction, i.e. counter to the direction of advancement, it rotates the arm 55, the wire bar 57 and the heated wire 56 into engagement with the plastic sheets 42 and 43 and with the anvil roller 60 to seal the leading edge of a bag being formed, while severing the bag being formed from a bag just completed. In FIG. 4C, the advancing counterclockwise rotation of the shaft 52 and the driven rollers 57 recommences and rotates the arm 55, the wire bar 57, and the heated wire 56 out of engagement with the advancing plastic film material. In order to assure that the heated wire 56 makes sufficiently good contact with the plastic film material 42 and 43, the torsional spring 54 referred to earlier joins motor 51 to the first shaft 52, stores potential energy while the plastic film is being advanced, and then releases it when the shaft 52 reverses and turns in the clockwise direction. The spring thus provides an additional force urging the wire 56 against the plastic film material to thereby ensure a good seal and complete severing of bags from one another.

Figure 5:
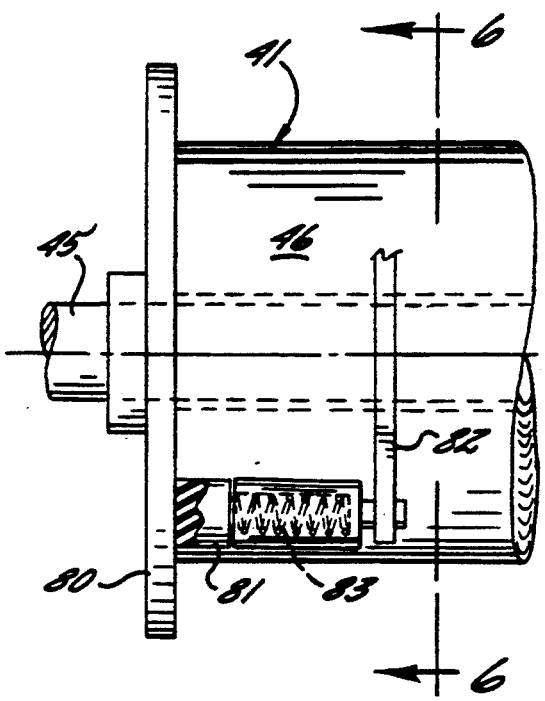
FIG. 5 is a cross-sectional view taken along lines 5—5 of FIG. 3 and illustrating aspects of the proportional braking system of the present invention.
Figure 6:
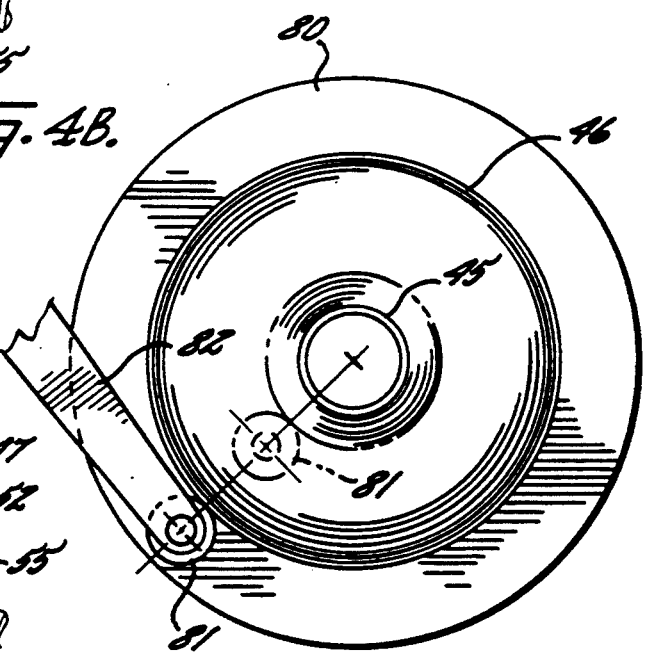
FIG. 6 is a cross-sectional view taken along lines 6—6 of FIG. 5.

As shown in the most detail in FIGS. 5 and 6, the apparatus of the invention further comprises a proportional braking system for braking the advancement of the plastic film material to thereby apply an appropriate tension to the sheets as they are being advanced from the stock supply. Those familiar with the advancement and sealing of plastic film material will recognize that such appropriate tension aids in many types of handling of plastic film, including sealing and severing operations. As illustrated in FIGS. 5 and 6, the proportional braking system is associated with the supply hub 45. As illustrated, the proportional braking system comprises a brake disc 80 mounted coaxially on the supply hub 45. A brake pad 81 is urged against the brake disc 80 for applying a braking force to the disc 80, to the hub 45, and in turn to the plastic film material 41. Means, shown as the arm 82, movably position the brake pad 81 against the stock supply roll 46 of plastic film material 41 on the hub 45 while the pad 81 is being urged against the disc 80. As a result, the radial position of the brake pad 81 on the disc 80 is defined by the amount of plastic film material 41 on the stock supply roll 46. In turn, the braking force applied by the brake pad 81 and the brake disc to the hub 45 is defined by the radial position of the pad 81 on the disc 80. In particular, the pad 81 is urged by the spring 83 to press against the disc 80. The arm 82 is in turn mounted through an appropriate linkage shown as the elements 84 and 85 and the spring 86 to any appropriate portion of the frame, with the only qualification being that the arm 82 be permitted to pivot in a manner which allows the brake pad 81 to rest against the brake disc 80 while continuing to follow the amount of plastic film material 41 on the supply roll 46. Stated differently, the force of the brake pad 80 against the disc 81, combined with the rotation of the disc 80 defines a torque which in turn is defined by the radial position of the brake shoe 81 compared to the hub 45 (FIG. 6). Because the radial distance between the brake pad 81 and the hub 45 will change as the supply roll decreases (or is reloaded and therefore increases), the torque will likewise change, and will accordingly apply a greater or lesser braking and tensioning force to the plastic film material as operation of the apparatus proceeds.

FIG. 3 also illustrates that in preferred embodiments, the arm 82 is also positioned so that when the film supply is exhausted and one end of the arm 82 reaches the supply hub 45, the other end of the arm 82 reaches a switch 78 that stops further operation until the film supply is replenished.

As set forth above, one of the main advantages of the invention is the application of a tape strip instead of a heat seal to form one longitudinal edge of the cushioning bags being formed by the apparatus. The tape strip avoids the problems and complexities of heat sealing and forms a stronger mechanical seal. Thus, the invention further comprises means for attaching such a strip to a longitudinal edge of both of the sheets 42 and 43 as they are being advanced to thereby join the sheets together and form one edge of a bag. In preferred embodiments, the plastic strip applying means comprises means for applying a strip of adhesive backed plastic tape to the advancing sheets of film material.

These features are best illustrated in FIGS. 9, 10 and 11. As seen therein, the tape dispensing means is broadly designated at 87. The dispensing means comprises a horizontally oriented tape dispenser arm 90 positioned perpendicularly to the path of travel of the plastic film material 42 and 43. A tape supply roll hub 91 is on the dispenser arm 90 and carries a tape supply roll 92. The dispenser arm further comprises means shown as the idlers 93 and the folding element 94 for guiding the adhesive tape 95 from the supply roll 92 on the hub 91 to the path of travel of the center folded plastic film material 41 and then folding the adhesive tape 95 to meet and thereby join the respective edges of the plastic sheets 42 and 43 to form one edge of a bag being formed. As further illustrated in FIGS. 10 and 11, the dispenser further includes a spring 96 which biases one of the idlers 93 against the tape supply 92 to provide a proper tape path. A handle 97 is used to move the idler 93 out of position to load a roll of tape 92. The length of the tape path can be adjusted using the adjustment screw 100 in accordance with the appropriate threaded fixtures 101 and 102. In a like manner, the lateral position of the tape can be adjusted using the adjustment screw 103 and its appropriate threaded fitting 104.

FIGS. 7, 10 and 11 further illustrate the tape folding element 94. As perhaps best illustrated in FIG. 7, the tape travels over the folding element 94, changes direction perpendicularly, and is applied to the respective sheets 42 and 43 of plastic film material. These sheets are positioned with their respective edges adjacent one another. The folding element 94 center folds the tape 95 with the adhesive on the inside surfaces defined by the center fold. In turn, one adhesive surface is applied to the plastic sheet 42 and the other adhesive surface to the plastic sheet 43. In the resulting seal, the adhesive tape 95 holds the edges of the sheets 42 and 43 together and the center fold on the tape forms one edge of the bag being formed.

The present invention further includes a tape advancement sensor for determining whether tape is being advanced from the tape supply roll 92 on the tape supply roll hub 91. The tape advancement sensor is illustrated in FIGS. 10 and 11 as the rotating disc 105 in contact with the tape supply roll hub, and is rotatable when the hub 91 rotates. Alternatively, when the hub stops rotating, the disc 105 likewise stops rotating and the motor 51 stops the entire apparatus. The tape advancement sensor is operatively associated with the motor 51 for preventing the motor 51 from advancing plastic film unless the tape 95 is advancing properly to thereby stop the apparatus and prevent waste or damage whenever the tape supply is exhausted or the tape stops for some other reason. Simply stated, if the hub 91 stops rotating, the lack of rotation will be caused either by a lack of tape, or a lack of movement of the tape. In either case, the disc 105 will stop rotating and in conjunction with its associated encoder 106 will command the entire device to cease operation. This provides an additional safety feature so that, for example, foam would no longer be injected if tape were no longer being advanced.

The drawings additionally illustrate some further details of the invention. FIG. 3 shows the plastic film guide bar 77 as well as the means for forming a ventilation opening in each bag being formed. These means are shown as the knife 107 and the solenoid control 110.

The knife 107 and solenoid 110 are illustrated in FIGS. 1 and 3 and form the opening 37 previously described with respect to FIG. 2. As known to those familiar with the formation of such bags, they are most useful when filled with foam rather than foam or other gases. Thus, by providing a ventilation opening, the gas that is generated as the foamable composition foams can escape so that the bag and the foamable composition therein are free to form a custom shaped foam package around any given object without having excess gas pressure rupture the bag.

FIG. 3 also indicates that in order to select and control the length (and thus the overall size) of bags being formed for various purposes, the apparatus further includes an encoder 111 connected to the first shaft 52 by pulleys 112 and 113 and pulley belt 114. Stated relatively simply, the encoder 111 counts the number of rotations of the shaft 52 and translates the data into a measurement of the length of the bags being formed.

FIGS. 7, 10 and 11 illustrate that in order to match the plastic sheets 42 and 43 to the tape 95, a sheet guide 115 is included on the tape guide 90 to ensure that the sheets 42 and 43 are aligned and adjacent to one another as the tape 95 is folded and applied to the sheets.

FIG. 1 shows that the tape dispenser means 87 taken as a whole can be placed in and supported by the horizontal member 25 of the overall framework of the apparatus 20.

Additionally, FIGS. 1 and 4A through 4C illustrate that in preferred embodiments, the apparatus includes foam spreader bars 115 opposite the foam injection nozzle 72. The bars 115 provide an appropriate partial target for foam precursors when the precursors are being injected, and help direct the foam precursors longitudinally within a bag being formed. As a result, the precursors and the foam they produce tend to spread more evenly within a just-formed cushion, resulting in a better ultimate distribution of hardened foam in a package.

In addition to the apparatus embodiment, the present invention is a method of successively forming foam filled cushions for packaging purposes of the type in which a bag containing foam precursors is added to a container so that as the foam precursors form foam the bag forms a custom cushion adjacent objects in the container. As a method, the invention comprises attaching an adhesive strip to the longitudinal edges of a pair of sheets of plastic film material being advanced along predetermined paths of travel in face-to-face contact from a stock supply, and between which sheets a foamable composition is injected to thereby join the sheets together and form one edge of the bag while periodically sealing the leading edge and the trailing edge of the sheets together transversely to the path of travel to form a bag while periodically severing a completed bag from the next succeeding bag being formed.

Stated in somewhat more detail, the method comprises advancing a pair of sheets of plastic film material along predetermined paths of travel in face-to-face contact from a stock supply and in preferred embodiments comprises advancing a single sheet folded longitudinally along its center to form a pair of sheets having one closed side edge defined by the center fold. The method then comprises periodically sealing the leading edge of the sheets together transversely to the path of travel to form a leading edge of a bag, periodically introducing a foamable composition between the sheets into each bag being formed, and attaching a strip to a longitudinal edge of both sheets as the sheets are advanced to join the sheets together and form another edge of the bag. As stated previously, in preferred embodiments, the method comprises attaching a strip of adhesive backed plastic tape to the sheets along the longitudinal edge. In particular, the tape is advanced from a supply roll, the tape is folded longitudinally along its center to form a folded tape web that defines two faces, and one face of the folded tape is applied to one of the sheets of plastic film and the other face of the folded tape web is applied to the other sheet of plastic film to thereby join the two sheets with the tape and with the fold in the adhesive backed plastic tape forming the longitudinal edge of the bag being formed.

The method is then completed by periodically sealing and severing the sheets upstream of the leading edge to form a trailing edge of the bag while severing the completed bag from the next succeeding bag being formed. As noted elsewhere herein, the method can further comprise the step of forming a ventilation opening in each bag to thereby provide for the escape of gases formed as the foam precursors foam without allowing those gases to rupture a completed sealed bag. In the preferred embodiment, the step of forming a ventilation opening in each bag comprises rotating a knife into contact with at least one of the sheets as the sheets are being advanced.

In the drawings and specification, there have been disclosed typical preferred embodiments of the invention, and, although specific terms have been employed, they have been used in a generic and descriptive sense only and not for purposes of limitation, the scope of the invention being set forth in the following claims.

That which is claimed is:

1. A method of successively forming foam filled cushions for packaging purposes of the type in which a bag containing foam precursors is added to a container so that as the foam precursors form foam, the bag forms a custom cushion adjacent objects in the container, the method comprising:

advancing a sheet of plastic film material folded longitudinally along its center in face to face contact to form one closed side edge defined by the center fold and one open side edge defined by the adjacent edges of the folded sheet along a predetermined path of travel in face to face contact from a stock supply;

periodically sealing the leading edge of the folded sheet together transversely to the path of travel to form a leading edge of a bag;

periodically introducing a foamable composition between the folded sheet into each bag being formed;

attaching an adherable strip to the open side edge of the folded sheet as the sheet is being advanced to join and seal the folded sheet together and form a sealed edge of the bag;

periodically sealing and severing the folded sheet upstream of the leading edge to form a trailing edge of the bag while severing the completed bag form the next succeeding bag being formed; and forming a ventilation opening in each bag other than in the edge sealed with said adherable strip.

2. A method according to claim 1 wherein the step of attaching an adherable strip to the open side edge of the folded sheet comprises applying a strip of adhesive-backed plastic tape to the sheet along the open side edge.

3. A method according to claim 2 wherein the step of applying the adhesive backed plastic tape comprises:
   advancing the tape from a supply roll;
   folding the tape longitudinally along its center to form a folded tape web that defines two faces; and
   applying one face of the folded tape web to one side of the open side edge of folded plastic film and applying the other face of the folded tape web to the other side of the open side edge of folded plastic film to thereby join the open edge with the tape, and with the fold in the adhesive-backed plastic tape forming the longitudinal edge of the bag being formed.

4. A method according to claim 1 wherein the step of forming a ventilation opening in each bag comprises rotating a knife into contact with at least one of the sheets as the sheets are being advanced.

5. An apparatus for forming foam filled cushions for packaging purposes of the type in which a bag containing foam precursors is added to a package so that as the foam precursors form foam, the bag forms a custom cushion adjacent objects to be packaged, said apparatus comprising:
   means for advancing a sheet of plastic film material folded longitudinally along its center along a predetermined path of travel in face to face contact from a stock supply;
   means for periodically sealing the leading edge of the folded sheet together transversely to the path of travel to form the leading edge of a bag being formed while concurrently forming the trailing edge of the previous bag and while severing the previous bag from the bag being formed;
   means for periodically introducing a foamable composition between the folded sheet into each bag being formed;
   means for attaching an adherable strip to the open side edge of the folded sheet as the sheet is being advanced to join and seal the folded sheet together and form a sealed edge of the bag; and
   means for forming a ventilation opening in each bag other than in the edge sealed with said adherable strip.

6. A cushion forming apparatus according to claim 5 wherein said advancing means comprises:
   a supply hub for a stock supply roll of folded film material;
   a pair of coaxial driven rollers downstream of said supply hub;
   a pair of coaxial follower rollers opposite to and in engagement against said driven rollers for driving plastic film material between said driven rollers and said follower rollers; and
   a motor for driving said driven rollers.

7. A cushion forming apparatus according to claim 5 wherein said transverse sealing means comprises:
   a heated wire disposed transversely to the path of travel of the folded sheet of plastic film material; and
   means for moving said wire into engagement with the advancing folded sheet of plastic film material.

8. A cushion forming apparatus according to claim 5 and further comprising a proportional braking system for braking the advancement of the plastic film material to thereby apply an appropriate tension to the folded sheet as it is being advanced from a stock supply.

9. A cushion forming apparatus according to claim 5 wherein said adherable strip attaching means comprises means for applying a strip of adhesive-backed plastic tape to the advancing folded sheet of plastic film material.

10. A cushion forming apparatus according to claim 5 and further comprising means for preventing foam from being introduced other than between the advancing folded sheet.

11. A cushion forming apparatus according to claim 10 wherein said foam introducing means comprises:
    a foam injection nozzle that extends into the path of travel of the folded plastic sheet; and
    a lever arm adjacent said nozzle that and in operational control of the flow of fluid from said nozzle, said lever arm being biased in a direction out of the path of travel while being movable into the path of travel so that said arm remains in the path of travel as long as the respective sides of the folded sheet are on opposite sides of said arm, and so that if either or both sides of the folded sheet are out of position with respect to the path of travel, said arm is biased out of the path of travel and prevents said nozzle from injecting foam.

* * * * *